United States Patent [19]

Wetterhorn

[11] 4,237,738
[45] Dec. 9, 1980

[54] PRESSURE MEASURING SUB-ASSEMBLY AND AMPLIFIER SUPPORT THEREFORE

[75] Inventor: Richard H. Wetterhorn, Fairfield, Conn.

[73] Assignee: Dresser Industries, Inc., Dallas, Tex.

[21] Appl. No.: 35,379

[22] Filed: May 3, 1979

Related U.S. Application Data

[63] Continuation-in-part of Ser. No. 948,368, Oct. 4, 1978, abandoned.

[51] Int. Cl.³ .............................................. G01L 7/04
[52] U.S. Cl. ...................................................... 73/740
[58] Field of Search .................................. 73/732–743

[56] References Cited

U.S. PATENT DOCUMENTS

| | | | |
|---|---|---|---|
| 1,835,561 | 12/1931 | Eshbaugh | 73/737 |
| 2,244,334 | 6/1941 | Hopkins | 73/715 |
| 2,447,739 | 8/1948 | Courtney | 73/732 |
| 3,398,583 | 8/1968 | Heise et al. | 73/738 |
| 4,055,085 | 10/1977 | Wetterhorn | 73/740 |

Primary Examiner—Donald O. Woodiel
Attorney, Agent, or Firm—Daniel Rubin

[57] ABSTRACT

A pressure measuring sub-assembly for a pressure gauge is comprised of a Bourdon tube providing total support for the gauge amplifier operably connected to drive an output pointer shaft. Th sub-assembly can be installed as a unit in a gauge housing providing a self-supporting inlet connection for the Bourdon tube.

In a preferred embodiment, the amplifier is supported on the displacement portion of the Bourdon tube and in the process of manufacture a swageable clamp is loosely placed near the fixed end of the Bourdon tube to loosely receive the secureable end of an elongated wire actuator. The opposite actuator end extends into the motion path of the amplifier to define a pivot axis therefor. When calibrating the unit for linearity, the Bourdon tube is first pressurized to one-half of rated operating capacity, and while maintaining calibration pressure the clamp is subjected to a bi-directional swaging force which selectively crimps the clamp to secure it to the Bourdon tube and the actuator to the clamp.

25 Claims, 11 Drawing Figures

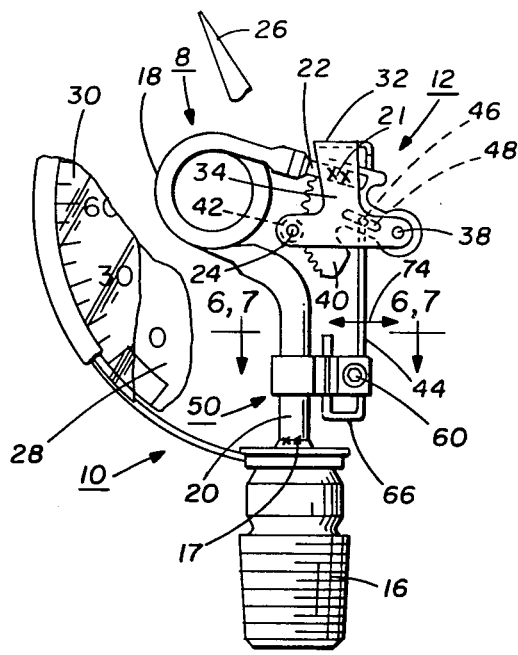
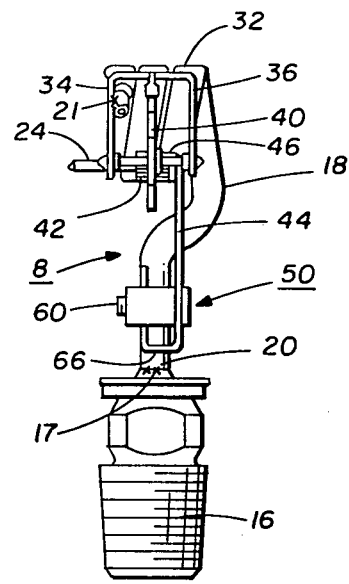
FIG. 4  FIG. 5
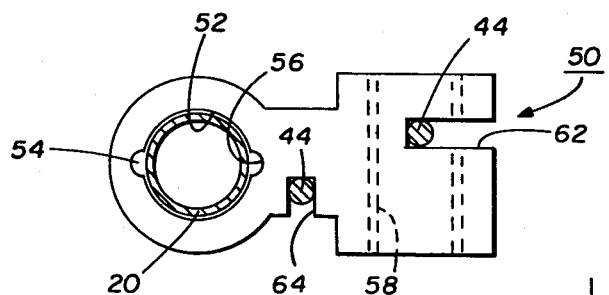
FIG. 6
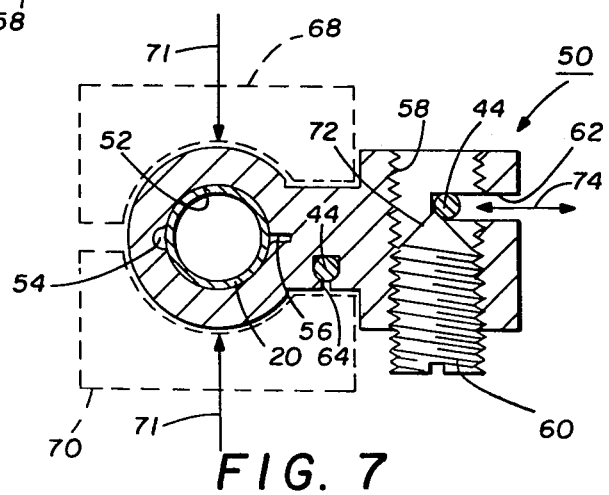
FIG. 7

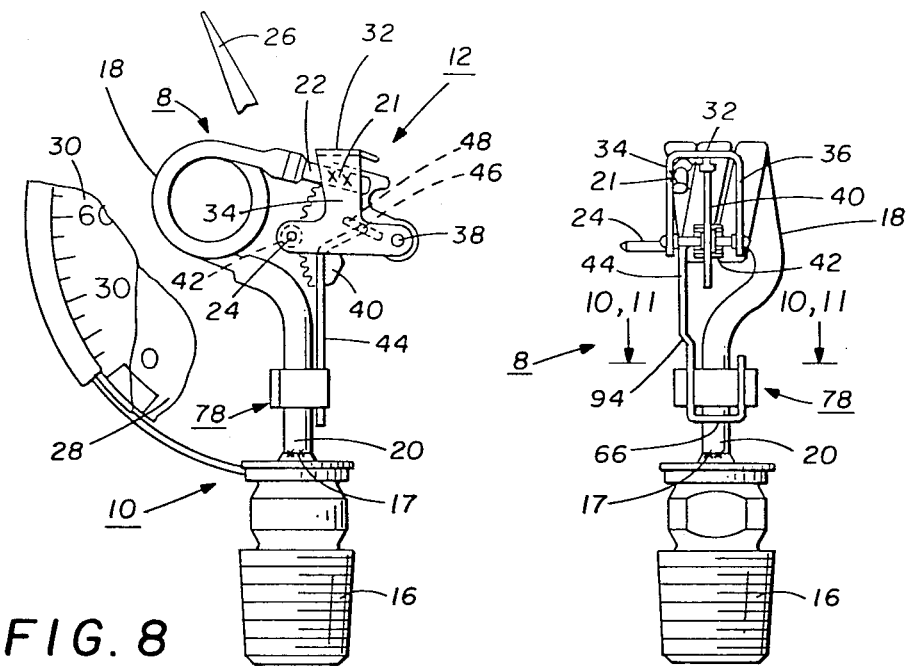
FIG. 8
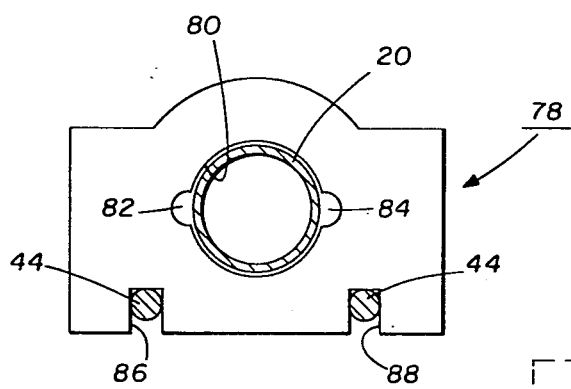
FIG. 9
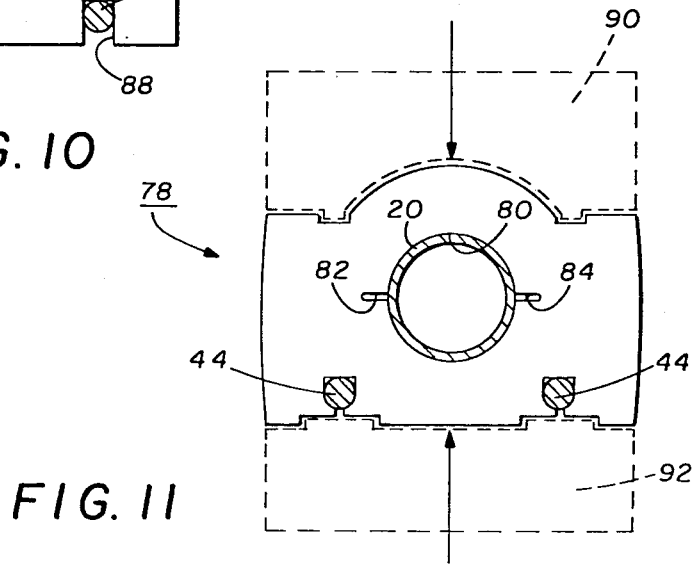
FIG. 10
FIG. 11

PRESSURE MEASURING SUB-ASSEMBLY AND AMPLIFIER SUPPORT THEREFORE

This application is a continuation-in-part of application Ser. No. 948,368 filed Oct. 4, 1978, now abandoned.

TECHNICAL FIELD

The field of art to which the invention pertains includes the art of measuring and testing as applicable to the construction of pressure gauges.

BACKGROUND OF THE PRIOR ART

Pressure gauges as a commercial commodity have largely enjoyed a more or less standard construction for many years. In a typical prior art construction, the Bourdon tube and amplifier forming the pressure measuring system are individually supported in the gauge structure. This has required not only the separate supports but the separate connections thereto and consequent post-assembly calibration of the instrument. While not affecting performance of the gauge, these factors have been recognized as requiring an excess of support structure while contributing to inefficiency of fabrication and calibration. Despite recognition of this problem, a solution therefor has not heretofore been known.

SUMMARY OF THE INVENTION

This invention relates to a pressure measuring sub-assembly construction for a pressure gauge. More specifically, the invention relates to a novel such sub-assembly which lends itself to both a reduction of materials and to a more efficient fabrication and calibration as compared to constructions of the prior art.

This is achieved in accordance with the invention by a sub-assembly construction in which all components of the gauge amplifier or "movement," including the output pointer shaft, are operatively supported between the displacement end portion of the Bourdon tube and a relatively non-displacement portion thereof in a manner not requiring supplemental support for the amplifier in the ultimate assembly. With the Bourdon tube having an open inlet it can then be installed in any suitable gauge housing affording a self-supporting inlet connection therefor whereby the one joint provides both the fluid passage and the entire support for the pressure measuring system.

In a preferred embodiment affording an economy hereof, the amplifier is of a type disclosed in U.S. Pat. No. 4,055,085 to R. H. Wetterhorn. As disclosed in the patent to Wetterhorn, the amplifier is supported on the free end of the Bourdon tube for floating conjoint movement with pressure displacement of the tube end. A remotely connected wire actuator extending into the motion path of the floating amplifier defines a pivot axis for a hinged gear sector arm. In pivoting about the actuator axis, the sector arm operably drives a rotatable output shaft supporting the pointer. An actuator clamp is mounted directly into a gripping relation onto the fixed end of the Bourdon tube while slots in the clamp spaced from the tube mount can receive and anchor the actuator position. The clamp accepts both the Bourdon tube and actuator wire in a loose relation but is of material composition and configuration that will respond to a bi-directional swaging force for effecting a crimped grip relation therewith. Because the actuator is not anchored until the Bourdon tube is pressurized for linearity calibration, each Bourdon tube is essentially able to select its own active wire length.

By means of the foregoing sub-assembly, its manufacturing costs as compared to otherwise comparable gauge internals of the prior art is dramatically reduced. Moreover, by being a self-contained sub-assembly, calibration can be effected in the sub-assembly state, thereby enabling precalibration in inventory prior to final assembly.

It is therefore an object of the invention to provide a novel sub-assembly construction for the pressure measuring system of a pressure gauge.

It is a further object of the invention to effect a sub-assembly construction as in the previous object which per se can be pre-calibrated prior to final assembly into the gauge instrument.

It is a further object of the invention to provide a novel clamp structure for securing the elongated actuator of a floating gauge amplifier.

It is a still further object of the invention to effect the previous object with a clamp structure that readily enables each Bourdon tube to essentially select its own active length of actuator.

BRIEF DESCRIPTION OF THE DRAWINGS

FIG. 4 is a fragmentary front elevation of a pressure gauge utilizing the sub-assembly of FIG. 1;

FIG. 5 is a side elevation of FIG. 4;

FIGS. 6 and 7 are plan views of the actuator clamp taken substantially along the lines 6, 7—6, 7 for the pre-swaging and post-swaging relations, respectively;

FIG. 8 is a fragmentary front elevation of a pressure gauge utilizing the sub-assembly of FIG. 1 with an alternative actuator clamp to that of FIG. 4;

FIG. 9 is a side elevation of FIG. 8; and

FIGS. 10 and 11 are plan views of the alternative embodiment clamp taken substantially along the lines 10, 11—10, 11 for the pre-swaging and post-swaging relations, respectively.

Figure 1:
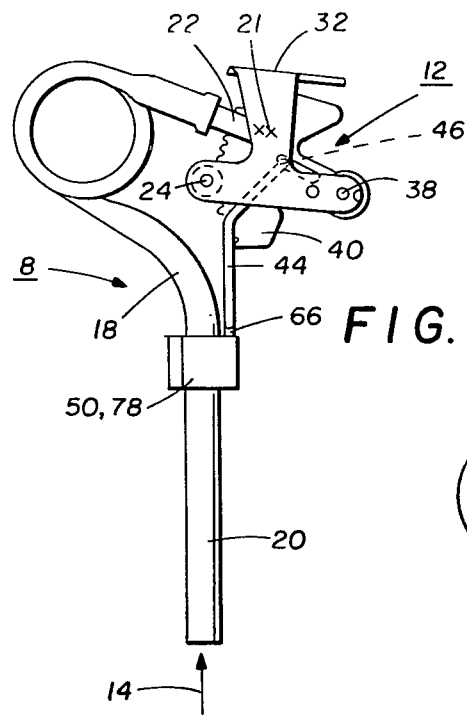
FIG. 1 is an elevation view of the pressure measuring system sub-assembly in accordance with a preferred embodiment.

Referring first to FIG. 1, the pressure measuring sub-assembly construction 8 for a pressure gauge in accordance herewith is comprised of Bourdon tube 18 having a free end 22 adapted for displacement in correlation to the value of pressures 14 received at fixed inlet 20. Inlet 20 in turn is adapted for installation in a gauge housing providing an appropriate inlet connection by which the sub-assembly can be connected and rendered self-supporting, as will be understood. The composition of Bourdon tube 18 is preferably one having a wide range of service applications such as 316 stainless steel.

Supported from tube end 22 is a floating amplifier 12 of a type disclosed in the Wetterhorn patent supra for operating a pointer shaft 24. A wire actuator 44 has one end 46 extending into the motion path of amplifier 12 whereas its opposite end 66 is secured in either a clamp 50 or clamp 78 to be explained. Either of the clamps 50 or 78 is in turn secured on a non-displacement portion of Bourdon tube 18 relatively near fixed end 20. It can be appreciated that the foregoing when assembled is completely self-contained and self-supporting. When pre-calibrated, as will be explained, the sub-assembly is ready for end use in a pressure gauge by merely connecting tube end 20 in a rigid connection to an appropriate pressure source opening provided in a gauge housing with which it is to be used.

Figure 2:
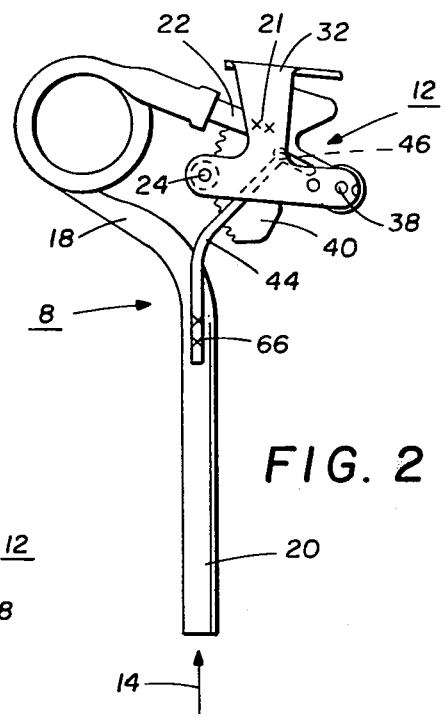
FIGS. 2 and 3 are elevation views of alternative embodiments to that of FIG. 1 for the sub-assembly hereof.

The sub-assembly embodiment of FIG. 2 is similar in all respects to the previous embodiment except that lower end 66 of actuator 44 is secured directly to the Bourdon tube near its fixed end without the benefit of a clamp as by welding or the like.

Figure 3:
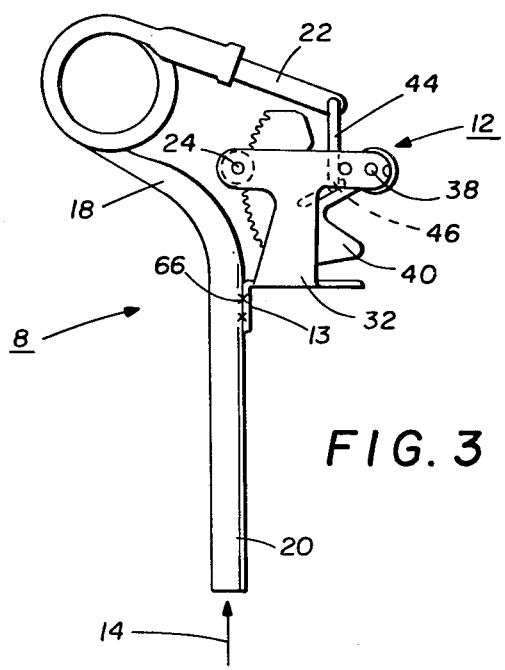

For the sub-assembly embodiment of FIG. 3, amplifier 12 and wire actuator 44 are inverted and interchanged as likewise disclosed in the cited patent to Wetterhorn. For these purposes, amplifier 12 is secured to the Bourdon tube near its fixed end 20 while actuator 44 is displaceable by tube end 22. In a preferred arrangement, securing the amplifier is effected by means of a bracket 13 attached to the Bourdon tube as by welding or the like.

Referring now to FIGS. 4-7 of the drawings, the sub-assembly of FIG. 1 is secured in a self-supporting position in a pressure gauge 10 by the fixed end 20 of Bourdon tube 18 being welded or clamped at 17 to the outlet end of gauge socket 16. Amplifier 12 is mounted by weld 21 on tube end 22 as disclosed in co-pending application Ser. No. 948,369 filed Oct. 4, 1978 now U.S. Pat. No. 4,168,631. Being secured to the Bourdon tube in that manner enables the amplifier to float conjointly with displacement of tube end 22 to effectively drive shaft 24 supporting a pointer 26. Arcuate displacement of the pointer by operation of shaft 24 reflects values of pressure as represented by graduations 30 on dial face 28.

As more fully described in the above Wetterhorn patent, amplifier 12 is comprised of a centrally upright inverted U-shaped carriage or frame 32 integrally formed to include symmetrically spaced apart side legs 34 and 36. The frame is secured by weld 21 at the free end 22 of Bourdon tube 18 for floating movement conjointly therewith and supports rotatable transverse shafts 24 and 38. The latter shaft provides a hinge support for a geared sector arm 40 while shaft 24 supports a pinion 42 meshing with sector arm 40 for displacing pointer 26 as described above. To effect operation of the amplifier there is provided an actuator 44 comprising elongated stainless steel wire of about 0.032 inches in diameter bent or offset at its upper end 46 for receipt in slot 48 of sector arm 40. At its other end, the actuator is secured in a clamp 50 in accordance herewith to be described.

Clamp 50, as seen in FIG. 6, is of a laterally elongated structure having a vertically oriented thrubore 52 near one end. Bore 52 is of diameter slightly larger than the O.D. of Bourdon tube end 20 to enable a slip fit thereon before the latter is secured to socket 16. A pair of oppositely located relief areas 54 and 56 each communicate inwardly with bore 52 for reasons as will be explained. Laterally displaced from the axis of bore 52 is a transverse threaded bore 58 containing a set screw 60. Inwardly recessed slots 62 and 64 are each adapted to receive loosely the downwardly extending and upwardly extending portions, respectively, of reverse actuator bend 66 with the former slot being substantially located in vertical alignment with sector slot 48.

With the existing loose fitting arrangement of FIG. 6, securing actuator wire 44 in clamp 50, as well as securing clamp 50 to Bourdon tube end 20, is effected in the manner of FIG. 7. By first pressurizing the Bourdon tube to about fifty percent of rated capacity of the gauge to effect linearity adjustment as described in the Wetterhorn patent supra, actuator wire 44 is free to move upward along with sector arm 40. A pair of opposed crimping dies 68 and 70, shown in phantom, are then brought together in the direction of arrows 71. The imposed die force against the clamp is sufficient to crimp aperture 52 against the tube wall 20 while at the same time laterally crimping slot 64 about the wire rod of actuator 44 thereat. By comparing FIGS. 6 and 7, it can be seen that recess 56 has been substantially closed off to effect the appropriate grip with a uniform compression load against the Bourdon tube without clamp metal being extruded inwardly. Moreover, since swaging occurred with the Bourdon tube pressurized during calibration, the active wire length of actuator 44 is essentially selected by the Bourdon tube.

In effecting the above, it should be appreciated that Bourdon tubes typically vary in wall thickness from about 0.008 to 0.012 inches and are high stress members subject to internal working pressures of up to on the order of 30,000 psig. It is important, therefore, in effecting the clamping grip therewith that additional cumulative stresses not be imposed which could either affect operation of the tube adversely or prompt its premature failure. In adhering to these limitations, it has been found that the clamp material can be any composition which when subject to crimping forces on the order of 1,000 pounds, is able to deform without cracking. Extruded aluminum is both suitable and most cost effective. Steel, brass, stainless steel, etc. are likewise suitable but somewhat less cost effective in current markets for those metals. With any of the named metals, overcrimping can be prevented by use of mechanical stops in the crimping dies. With crimping completed, span adjustment can be effected by needle nose 72 of set screw 60 being screwed toward or away from the actuator wire in slot 62 so as to displace the wire in the direction of arrow 74.

Referring now to FIGS. 8-11, the gauge construction is identical in all respects to the previous embodiment with the exception of a clamp 78 hereof having a construction similar in principle but different in detail from that of clamp 50 above. Like clamp 50, clamp 78 includes a thru-bore 80 for a slip fit mounting onto Bourdon tube end 20 and includes recesses 82 and 84 communicating therewith. Slots 86 and 88 are adapted to loosely receive the reverse bend lower portion of actuator 44 and are symmetrically arranged with respect to the center line of bore 80. On bringing dies 90 and 92 toward each other while the Bourdon tube is pressurized for calibration as described above, the clamp is crimped as before with both leg portions of the actuator bend being secured as a result thereof. Span adjustment for this embodiment is effected by bending actuator wire 44 at offset 94 until an appropriate setting is achieved.

By the above description there is disclosed a novel sub-assembly construction for the pressure measuring system of a pressure gauge. With the amplifier components being operatively supported on the Bourdon tube, precalibration renders the sub-assembly readily usable in any suitable gauge housing providing a pressure opening to which the Bourdon tube can be connected in a self-supporting relation. Being independent of the housing construction except for a connection at the pressure opening, even to the extent of not requiring supplemental support, affords significant manufacturing advantages for the fabrication of pressure gauges in which it is utilized. At the same time, the simple and uncostly construction of the actuator clamp of the preferred embodiment affords a convenient means of enabling the Bourdon tube to essentially select its own active length of actuator wire.

Since many changes could be made in the above construction and many apparently widely different embodiments of this invention could be made without departing from the scope thereof, it is intended that all matter contained in the drawings and specification shall be interpreted as illustrative and not in a limiting sense.

The embodiments of the invention in which an exclusive property or privilege is claimed are defined as follows:

1. A pressure measuring sub-assembly for a socket containing pressure gauge comprising in combination:
   (a) a Bourdon tube extending between a displacement portion operatively displaceable in correlation to pressure changes to which it is exposed and a relatively non-displacement portion extending to an end defining a pressure inlet and adapted for a self-supporting connection to the socket of the pressure gauge;
   (b) an amplifier for communicating displacement motion of said Bourdon tube to an output shaft for a support of a gauge pointer;
   (c) support means supporting said amplifier secured to one of the said portions of said Bourdon tube at a location removed from said end; and
   (d) an elongated actuator secured to one of said portions of said Bourdon tube at a location removed from said end and extending therefrom to operably cooperate with said amplifier in effecting said displacement motion communication.

2. A sub-assembly according to claim 1 in which said actuator is connected to the other of said portions of said Bourdon tube.

3. A sub-assembly according to claim 2 in which said amplifier is operatively secured to the displacement portion of said Bourdon tube for floating conjoint movement therewith and said actuator is secured to the relatively non-displacement portion of said Bourdon tube for extending into the motion path of said amplifier.

4. A sub-assembly according to claim 3 including clamp means operatively securing said actuator to said Bourdon tube.

5. A sub-assembly according to claim 4 including means to calibrate operation of said amplifier relative to said Bourdon tube.

6. A pressure measuring sub-assembly for a pressure gauge comprising in combination:
   (a) a pressure responsive element extending between a displacement portion operatively displaceable in correlation to pressure changes to which it is exposed and a relatively non-displacement portion defining a pressure inlet and adapted for a self-supporting connection to a source of pressure to be measured;
   (b) an amplifier for communicating displacement motion of said pressure responsive element to an output shaft for support of a gauge pointer;
   (c) support means supporting said amplifier secured to said displacement portion of said pressure responsive element for floating conjoint movement therewith;
   (d) an elongated actuator secured to the relatively non-displacement portion of said pressure responsive element and extending therefrom into the motion path of said amplifier to operably cooperate with said amplifier in effecting said displacement motion communication; and
   (e) clamp means operatively securing said actuator to said pressure responsive element, said clamp means comprising first gripping means for attached mounting onto a relatively non-displacement portion of said pressure responsive element and second gripping means for securing said actuator.

7. A sub-assembly according to claim 6 in which said first and second gripping means are both swage imposed for effecting said attached mounting and actuator securing, respectively.

8. A sub-assembly according to claim 7 in which said clamp means is comprised of swageable metal composition, said first gripping means includes a first aperture through which to receive a relatively non-displacement portion of said pressure responsive element and said second gripping means includes a second aperture displaced from said first aperture in which to receive said actuator.

9. A sub-assembly according to claims 6, 7 or 8 in which said pressure responsive element comprises a Bourdon tube.

10. In pressure measuring apparatus including a pressure responsive element having a displacement portion operatively displaceable in correlation to changes in pressure to which it is exposed, an amplifier secured to the displacement portion of said element for floating conjoint movement therewith and an elongated actuator extending one end into the motion path of said amplifier to define a pivot axis therefor, clamp means comprising first gripping means for attached mounting onto a relatively non-displacement portion of said pressure responsive element and second gripping means for securing the opposite end of said actuator.

11. In pressure measuring apparatus according to claim 10 in which said pressure responsive element comprises a Bourdon tube.

12. In pressure measuring apparatus according to claim 11 in which said first and second gripping means are both swage imposed for effecting said tube mounting and actuator securing, respectively.

13. In pressure measuring apparatus according to claim 12 in which said clamp means is comprised of swageable metal composition, said first gripping means includes a first aperture through which to receive the relatively non-displacement portion of said Bourdon tube and said second gripping means includes a second aperture displaced from said first aperture in which to receive said opposite actuator end.

14. In pressure measuring apparatus according to claim 13 in which said opposite actuator end includes a reverse bend formation and said second gripping means includes a third aperture extending in a direction parallel to the direction of said second aperture.

15. In pressure measuring apparatus according to claim 14 in which each of said apertures are parallel to each other with said second and third apertures being located displaced oppositely relative to the axis of said first aperture and substantially symmetrical with respect thereto.

16. In pressure measuring apparatus according to claim 13 in which said opposite actuator end includes a reverse bend formation and said clamp means includes a third aperture through which said opposite actuator end can extend to said second aperture and a screw laterally engaging the actuator in said third aperture to enable span adjustment of the apparatus.

17. In pressure measuring apparatus according to claims 13, 14 or 16 in which said first aperture includes longitudinally extending radial recesses communicating outward from the wall surface thereof.

18. In pressure measuring apparatus according to claims 14, 15 or 16 in which said second and third apertures comprise open slots extending inward from a face of said clamp means.

19. In pressure measuring apparatus according to claims 10, 11, 12 or 13 in which each of said first and second gripping means are effectively imposed while the pressure responsive element is subject to an application of pressure corresponding to about one-half of the rated capacity of the apparatus.

20. A pressure measuring sub-assembly for a socket containing pressure gauge comprising in combination:
(a) a Bourdon tube extending between a displacement portion operatively displaceable in correlation to pressure changes to which it is exposed and a relatively non-displacement portion extending to an end adapted for a self-supporting connection to the socket of the pressure gauge;
(b) an amplifier for communicating displacement motion of said Bourdon tube to an output shaft for a support of a gauge pointer;
(c) an elongated actuator to operably cooperate with said amplifier in effecting said displacement motion communication; and
(d) means separately connecting said amplifier and said actuator to said Bourdon tube at a location removed from said end to render said amplifier, said actuator and said Bourdon tube a self-contained and self-supportable sub-assembly unit.

21. A sub-assembly according to claim 20 in which said amplifier is connected to one of said portions of said Bourdon tube and said actuator is connected to the other of said portions of said Bourdon tube.

22. A sub-assembly according to claim 21 in which said amplifier is operatively secured to the displacement portion of said Bourdon tube for floating conjoint movement therewith and said actuator is secured to the relatively non-displacement portion of said Bourdon tube for extending into the motion path of said amplifier.

23. A pressure gauge comprising in combination:
(a) a housing;
(b) a socket secured to said housing and defining an inlet opening through which to receive a source of pressure to be measured;
(c) a displaceable pointer operable for indicating values of pressure of a conveyed pressure source; and
(d) a self-contained and self-supportable sub-assembly unit comprising;
(1) a Bourdon tube extending between a displacement portion operatively displaceable in correlation to pressure changes to which it is exposed and a relatively non-displacement portion extending to an end connected in fluid communication relation with the inlet opening of said socket;
(2) an amplifier for communicating displacement motion of said Bourdon tube to said gauge pointer;
(3) an elongated actuator to operably cooperate with said amplifier in effecting said displacement motion communication; and
(4) means separately connecting said amplifier and said actuator to said Bourdon tube at a location removed from said end to render said amplifier, said actuator and said Bourdon tube self-supportable as a unit from where said Bourdon tube is connected in said communication relation.

24. A pressure gauge according to claim 23 in which the amplifier of said sub-assembly is connected to one of said portions of said Bourdon tube and the actuator of said sub-assembly is connected to the other of said portions of said Bourdon tube.

25. A pressure gauge according to claim 24 in which the amplifier of said sub-assembly is operatively secured to the displacement portion of said Bourdon tube for floating conjoint movement therewith and the actuator of said sub-assembly is secured to the relatively non-displacement portion of said Bourdon tube for extending into the motion path of said amplifier.

* * * * *